INVENTOR.
ARTHUR J. GEISENHAVER
BY
ATTORNEYS

March 19, 1963   A. J. GEISENHAVER   3,081,935
CENTRIFUGAL OIL SEPARATING AND ANTI-SLUGGING
DEVICE FOR REFRIGERATION COMPRESSORS
Filed Nov. 12, 1959   5 Sheets-Sheet 2

INVENTOR.
ARTHUR J. GEISENHAVER
BY
Barnes, Kisselle, Raisch & Choate
ATTORNEYS

March 19, 1963 A. J. GEISENHAVER 3,081,935
CENTRIFUGAL OIL SEPARATING AND ANTI-SLUGGING
DEVICE FOR REFRIGERATION COMPRESSORS
Filed Nov. 12, 1959 5 Sheets-Sheet 3

INVENTOR.
ARTHUR J. GEISENHAVER
BY
Barnes, Kisselle, Raisch & Choate
ATTORNEYS

INVENTOR.
ARTHUR J. GEISENHAVER

INVENTOR.
ARTHUR J. GEISENHAVER
BY
Barnes, Kisselle, Raisch & Choate
ATTORNEYS

United States Patent Office 3,081,935
Patented Mar. 19, 1963

3,081,935
CENTRIFUGAL OIL SEPARATING AND ANTI-SLUGGING DEVICE FOR REFRIGERATION COMPRESSORS
Arthur J. Geisenhaver, Tecumseh, Mich., assignor to Tecumseh Products Company, Tecumseh, Mich., a corporation of Michigan
Filed Nov. 12, 1959, Ser. No. 852,355
14 Claims. (Cl. 230—206)

This invention relates to a device for preventing compressor slugging in a refrigeration system.

The slugging of a compressor in a refrigeration system due to the accumulation of an excessive quantity of refrigerant in the compressor is a common occurrence. This condition arises during an off cycle where a refrigeration system is allowed to cool to surrounding ambient temperatures. If this cycle is long enough, all of the system components can reach a temperature equilibrium. With a rise in temperature, the compressor temperature usually lags behind the other system components since their temperatures follow the ambient rise. This is primarily due to the greater mass of the compressor. While the system is in this temperature unbalance, then due to a corresponding pressure unbalance there will be an internal migration of refrigerant such, for example, as Freon, to the coldest location in the system which is usually the compressor housing. The added amount of refrigerant will mix with the crankcase oil until saturation is reached and then will continue to accumulate at the bottom of the compressor housing because it is heavier in this liquid state than the crankcase oil. Any rapid reduction of pressure exerted on this mixture will cause the liquid refrigerant to change state to a gas. When the compressor is started, the gas phase refrigerant is pumped from the compressor thereby reducing the pressure on the remaining oil-refrigerant mixture. The reduced pressure causes the refrigerant to expand and oil to foam. This change of state can create violent oil foaming inside the compressor housing. The foam level rises until it reaches the suction pick-up or intake tube and is taken into the cylinder. If a large enough quantity of this refrigerant and oil mixture is consumed or drawn into the cylinder, compressor slugging occurs. The result of compressor slugging, regardless of the type of compressor, can be blown gaskets, broken valve leaves, broken pistons, rods, etc., any of which is fatal to compressor life.

It is an object of this invention to prevent a refrigeration system compressor from pumping liquid refrigerant and/or oil at any time and particularly during a start-up period.

This object is accomplished by separating the oil and/or liquid refrigerant from the gaseous refrigerant on the intake side of the compressor preparatory to admitting the gaseous refrigerant into the compressor.

Figure 7:
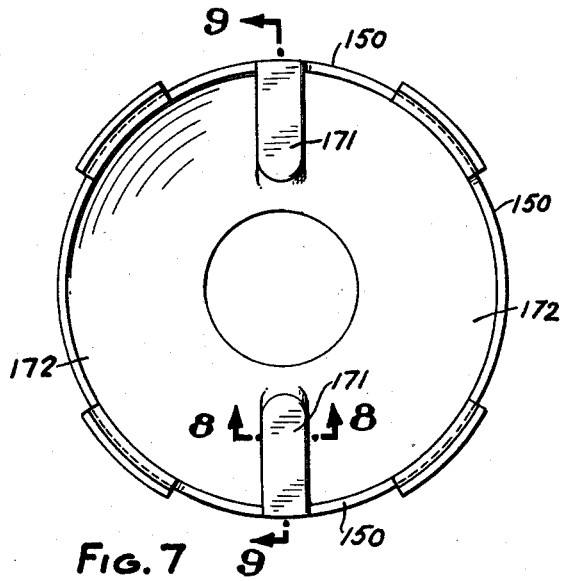
FIG. 7 is a detail of the lower component of the centrifugal separator shown in FIGS. 5 and 6.
Figure 9:
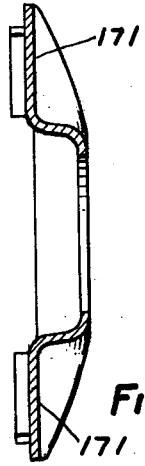
Figure 8:
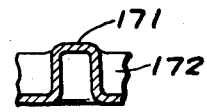

FIGS. 8 and 9 are sections along the lines 8—8 and 9—9 of FIG. 7.

Figure 5:
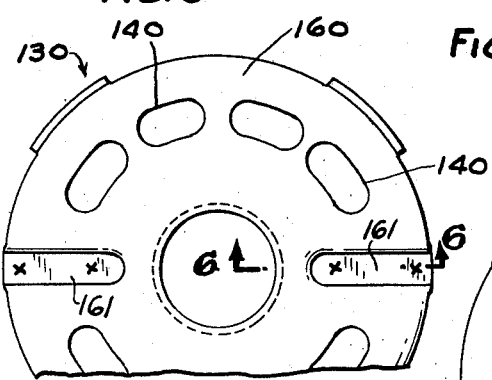
FIG. 5 is a top plan view of a modified form of my centrifugal separator.
Figure 4:
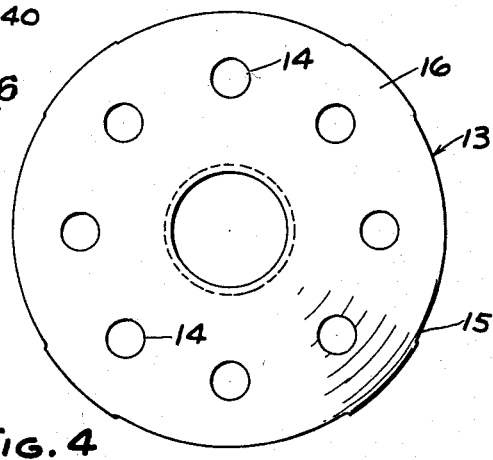
FIG. 4 is a top plan view of my centrifugal separator.
Figure 6:
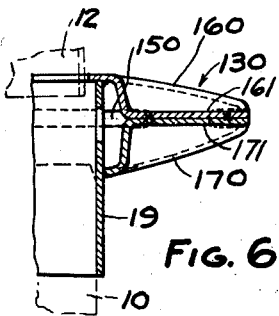
FIG. 6 is a section along line 6—6 of FIG. 5.
Figure 10:
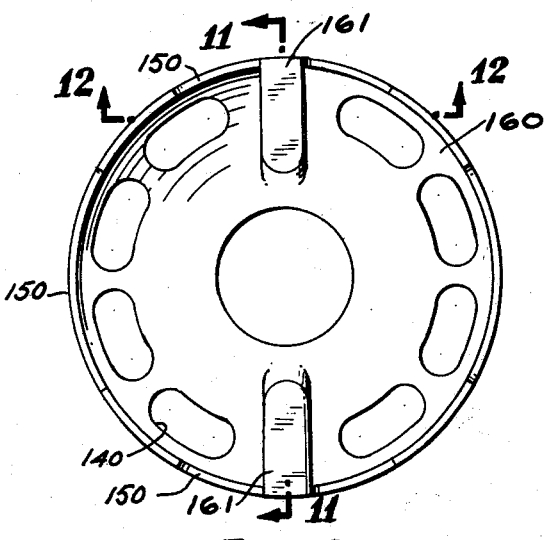

FIG. 10 is a detail of the upper component of the centrifugal separator shown in FIGS. 5 and 6.

Figure 12:
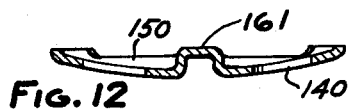
Figure 11:
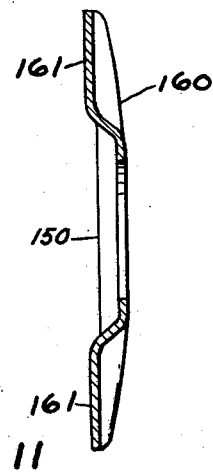

FIGS. 11 and 12 are sections along the lines 11—11 and 12—12 of FIG. 10.

Figure 13:
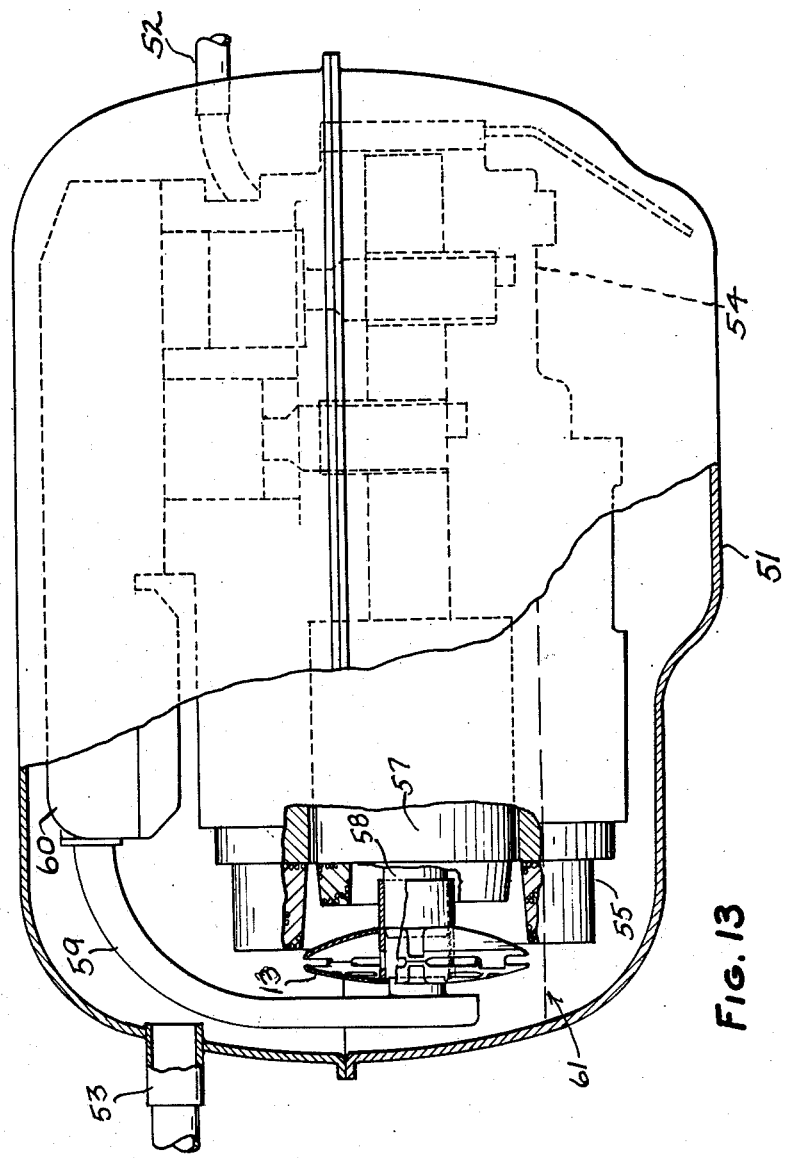

FIG. 13 is an elevation partly in section through a conventional horizontal shaft motor compressor unit for a refrigeration system which is equipped with my centrifugal oil and/or liquid refrigerant separating device.

Figure 14:
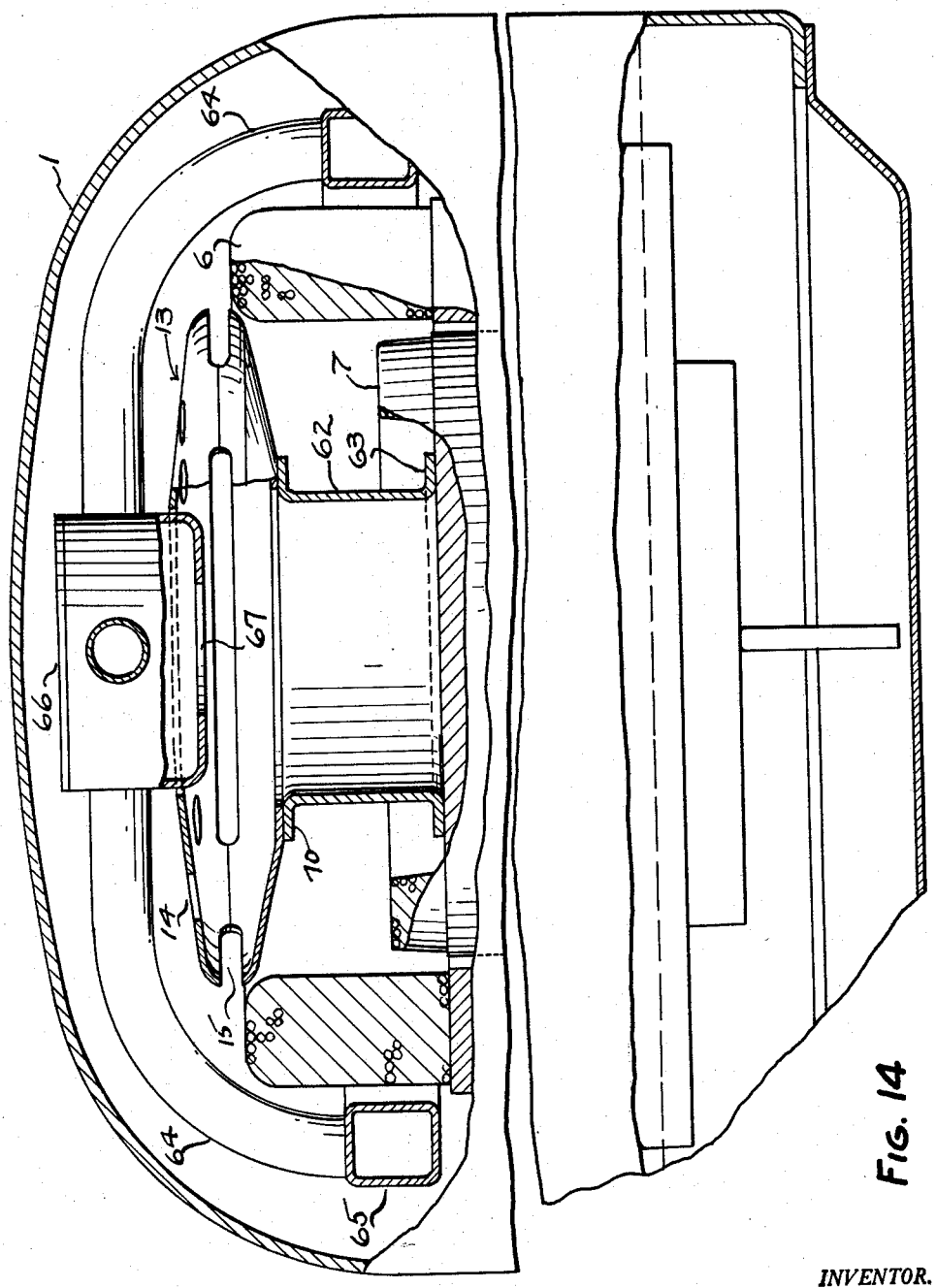

FIG. 14 is a fragmentary elevation partly in section of a conventional motor compressor unit for a refrigeration system provided with my centrifugal oil and/or liquid refrigerant separating device which is mounted on the rotor of the motor.

Figure 1:
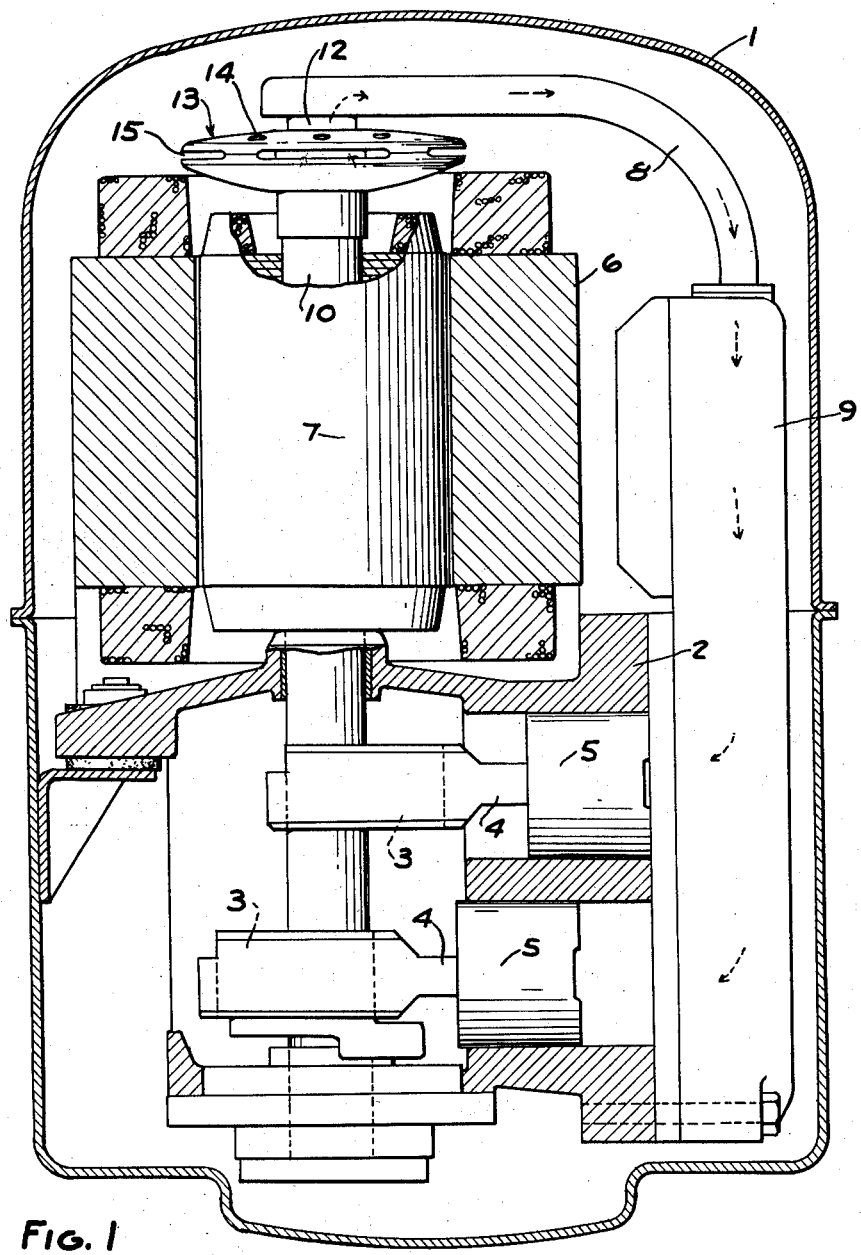
FIG. 1 is a vertical section through a conventional motor compressor unit for a refrigeration system which is equipped with my centrifugal oil and/or liquid refrigerant separating device.
Figure 2:
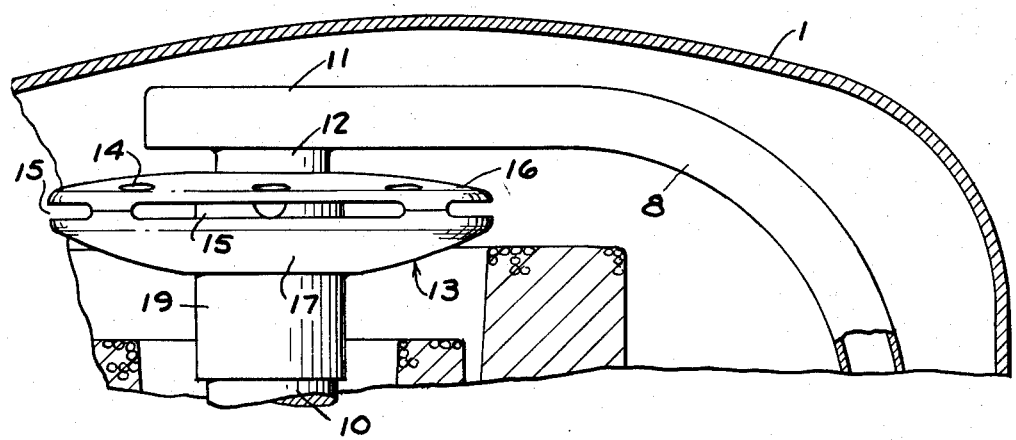
FIG. 2 is an enlarged fragmentary vertical section of the upper part of the motor compressor unit shown in FIG. 1 and showing the centrifugal separator in elevation.
Figure 3:
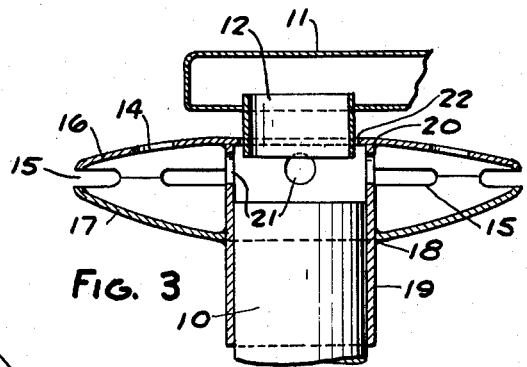
FIG. 3 is a vertical section through my centrifugal oil and liquid separator for compressors.

FIG. 1 is a vertical section through a conventional compressor. Although FIG. 1 shows a hermetically sealed unit compressor and motor assembly, it is understood that my invention is useful in any mechanical refrigeration system which utilizes a mechanical compressor in its cycle of evaporation, compression and liquefying the resultant gas and the return of this liquid refrigerant to the evaporator and wherein the lubricating oil and refrigerant mix.

In FIG. 1 the hermetically sealed housing or shell is designated 1, the compressor cylinder 2, the compressor eccentric 3, the connecting rod 4, the compressor piston 5, the induction motor stator and windings 6, the rotor 7, suction intake pipe 8, intake manifold 9, and the crankshaft 10. Although not shown, the compressor is provided with the conventional valve controlled intake and discharge ports. The conventional liquid-oil refrigerant mixture level in the housing 1 is not shown. This level of the oil and liquid refrigerant which collect in the lower part of housing 1, of course, varies in the course of the operation of the system.

One end of tube 8 is connected into the suction gas manifold 9 and the other end is connected into a header 11 which is provided with a tubular or hollow cylindrical inlet 12. Members 8, 11 and 12 are stationary, that is, non-rotative members of the motor compressor assembly.

My centrifugal liquid-oil and/or refrigerant separator is generally designated 13 and is mounted upon the upper end of the crankshaft 10 so as to rotate therewith at conventional crankshaft speeds. Centrifugal separator 13 consists of a hollow, preferably symmetrical body provided with a plurality of preferably similar or identical inlet ports 14 which may be located in either or both the upper and lower walls of the separator. As shown, the inlet ports 14 are mounted in the upper wall of separator 13 and preferably, but not necessarily, are equally spaced circumferentially one from the other and radially from the axis of rotation of crankshaft 10 and separator 13. Separator 13 is also provided with a plurality of similar or identical outlets 15 positioned at the outer circumference of the separator and preferably, but not necessarily, equally spaced from each other.

By way of illustration, separator 13 is herein shown as comprising an upper stamping 16 and a lower stamping 17. The stampings 16 and 17 are each dished and circular in form. The stampings 16 and 17 are placed one upon the other, concave side to concave side, with their circumferential edges coinciding and then secured together in any suitable way as by copper brazing. The upper and lower members are provided with arcuate cutout portions or notches which match to form the discharge openings 15 when the two members are fixed together.

The lower member 17 is provided with a centrally positioned opening 18. A cylindrical tubular body member 19 extends through opening 18 and abuts as at 20 against the inner face of the upper stamping 16. This tubular body member 19 is copper brazed or welded to the lower member 17 completely around the joint with opening 18 and to the upper member 16 completely around the abutting periphery 20 of member 19. Body member 19 is positioned centrally of the separator 13 and is pressed upon or otherwise fitted to crankshaft 10 so that it will rotate therewith at crankshaft speed. The upper end of the crankshaft 10 is spaced from the upper stamping 16. The tubular body 19 is provided with a plurality of equally spaced openings 21 which are located between the upper end of the crankshaft 10 and the top member 16. As herein shown there are four openings 21. The upper member 16 is provided with a central opening 22 through which the tubular inlet member 12 projects into the separator 13. For ease of manufacture the diameter of opening 22 is greater than the outer diameter of member 12 so that the clearance about member 12 also provides an inlet for the oil and refrigerant mixture within the compressor housing, however, this clearance may be sealed.

In the operation of my device the compressor will be run at any conventional and known speed and the separator 13 will rotate at the same speed or r.p.m. as the crankshaft 10. As the compressor operates to draw refrigerant from within housing 1 into the intake line 8 and manifold 9, oil ladened vapor or refrigerant-oil mixture will enter the separator through openings 14 and some of the refrigerant-oil mixture will also enter the separator through opening 22. Since the separator 13 is rotating at crankshaft speed, it acts as a centrifuge. The refrigerant-oil mixture entering the separator through ports 14 and 22 will spin with the separator. Because of the centrifugal force acting upon the oil-refrigerant mixture (this refrigerant-oil mixture will, of course, rotate with the separator 13) and the rapid changes of direction that the mixture is forced to take, the oil being the denser and heavier material is pumped or forced to the outside of the separator and is ejected through openings 15. Any oil-refrigerant mixture entering the separator through opening 22 is subjected to the same treatment in separator 13 so that the oil is separated from the gaseous refrigerant. In a similar fashion if there is any liquid refrigerant in the mixture which enters the separator through openings 14 or 22, then because the liquid refrigerant is denser than the gaseous refrigerant, it will also be pumped or thrown to the outside of the separator and ejected through openings 15. The refrigerant gas which has been separated from the oil and liquid refrigerant passes through openings 21 and inlet 12 into the intake pipe 8 and then on through the manifold 9 into the compressor where it is compressed and forced on through the condenser, evaporator and other components of the conventional refrigeration system.

Because my centrifugal separator separates the gaseous refrigerant from any liquid in the system, whether oil or liquid refrigerant or both, the refrigerant gas passing into the intake side of the compressor cylinder is free of liquid and slugging of the compressor with the resultant damage to the compressor is thereby avoided.

FIGS. 5 through 12 illustrate a modified form of separator 13 which is herein designated 130. This separator has a body 19 the same as above described, inlet openings 140 in the upper stamping 160 and equally spaced arcuate outlets 150 formed by arcuate notches in the upper member 160 and the lower member 170. Upper member 160 and lower member 170 are stampings and are assembled in edge to edge relation with their concave sides facing each other and then brazed or welded together. Tubular body 19 is mounted within the separator 130 the same as in the principal form of the invention.

The primary difference between separator 13 and the modified form of separator 130 is that the upper stamping 160 is provided with radially opposed raised ribs 161 and the lower stamped element is provided also with two radially extending opposed ribs 171. When the upper and lower members 160 and 170 are fixed together, ribs 171 and 161 contact in face to face relation and are brazed together. Thus the ribs 161 and 171 divide the inside of the separator into two semi-circular compartments 172 and the composite ribs 161, 171 form baffles or, in effect, blades against which the oil and liquid refrigerant drawn into the separator through openings 140 abut during the rotation of the separator. These blades 161, 171 throw the denser liquid components of the refrigerant-oil mixture toward the outside of the spinning separator and through outlets 150. The gaseous refrigerant, as in the principal form of the invention, passes through openings 21, tubular inlet 12 and suction line 8 into the intake manifold and then into the cylinder of the compressor.

My centrifugal oil and liquid refrigerant separating and anti-slugging device for refrigeration compressors is efficient, simple to construct, easily mounted within the compressor housing, substantially free from any maintenance and is economical to operate because it requires no other energy than that supplied by the electric motor component of the motor compressor unit.

In FIG. 13 there is shown a conventional electric motor compressor unit provided with a hermetically sealed housing or shell 51 provided with a discharge tube 52 to the condenser and a suction tube 53 from the evaporator. The compressor is designated generally by the numeral 54. The compressor 54 is actuated by the usual induction motor comprising a stator and windings 55 and a rotor 57. The crankshaft is designated 58, the suction intake pipe 59 and the intake manifold 60. The oil level line in the housing 51 is designated 61. This motor compressor unit is essentially the same as that shown in FIG. 1 except that the unit is positioned with its crankshaft 58 horizontal whereas in FIG. 1 the shaft 10 is positioned vertically. Shaft 58 is provided with my centrifugal liquid oil and/or refrigerant separator generally designated 13 and described above and therefore the description of separator 13 and its manner of mounting upon shaft 58 will not be repeated.

During the operation of the motor compressor unit my centrifugal separating device 13, as shown in FIG. 13, rotates about a horizontal axis rather than a vertical axis but operates to separate the oil and liquid refrigerant from the refrigerant gas in the same manner as described above where the separator 13 is mounted upon the vertically positioned shaft 10.

FIG. 14 illustrates my centrifugal separator 13 mounted upon the rotor 7 of the motor. The construction of centrifugal separator 13 shown in FIG. 14 is identical with that described above in FIGS. 1 through 4. However, separator 13 instead of being mounted upon the crankshaft of the compressor is mounted upon rotor 7 by means of a tubular body member 62. The body member 62 is secured to the rotor 7 as at 63 in any suitable manner such as by silver soldering or by screws and is secured to the separator by welding or silver soldering as at 70. The lower end of body member 62 is closed by the rotor. The suction lines are designated 64, the intake manifold 65. The suction lines 64 connect into a header 66 which receives the refrigerant gas from separator 13 through inlet 67. The separator 13 rotates with rotor 7 and operates to separate the refrigerant gas from the oil and/or liquid refrigerant in the same manner as described above where separator 13 is mounted on crankshaft 10.

From the above it is evident that I avoid slugging of oil and/or liquid refrigerant in a refrigeration compressor by the incorporation within the compressor housing of a centrifuge on the suction side of the compressor which separates the liquid oil and/or refrigerant from the gaseous refrigerant before the gaseous refrigerant is drawn into the compressor cylinder.

I claim:
1. A centrifuge for use within a refrigerant compressor casing containing a liquid reservoir exposed to gaseous refrigerant, said centrifuge comprising a hollow body through which the refrigerant flows preparatory to entering an intake of the compressor, said body comprising two concave stampings assembled together with the concave side of one stamping facing the concave side of the other stamping, said stampings each having a radially extending integral rib portion stamped therein, said ribs being shaped to contact each other in face-to-face relation and being joined together to hold said stampings in assembled relation, said body having a first outlet located on the center of rotation thereof adapted for communication with the intake of the compressor, at least one of said stampings having an inlet opening spaced radially outward of said first outlet and being separate therefrom for admitting gaseous refrigerant into said body from the reservoir, said body having a second outlet positioned radially outwardly of said inlet whereby any liquid passing through said inlet into said body is separated from gaseous refrigerant and discharged from the body through said second outlet and the gaseous refrigerant passes through said first outlet to the intake of the compressor, said ribs forming a blade serving to throw the liquid components of the liquid and refrigerant mixture entering said body toward the outside thereof and through said second outlet as the body rotates.

2. A centrifuge for use in a liquid laden gaseous environment in a refrigerant compressor comprising a hollow body adapted to be rotated in the gaseous environment and having a pair of walls spaced apart along the axis of rotation of said body and extending generally radially outwardly therefrom so as to define a centrifuge chamber therebetween, said body having an outlet passageway located substantially at said axis communicating with the centrifuge chamber, at least one of said walls being adapted for exposure to the gaseous environment and having an inlet passageway extending therethrough spaced radially outwardly of said outlet passageway for admitting liquid laden gas from the environment, said one wall having an imperforate portion disposed radially between said inlet and outlet passageways, said body having a second outlet passageway spaced radially outwardly from said inlet passageway and being separate therefrom for returning liquid from the chamber back to the environment.

3. A centrifuge for use in an encased refrigerant compressor and adapted for rotation by the compressor within an area of the casing of the compressor exposed to foaming of liquid therein, said centrifuge having a centrifuge chamber therein and a first outlet located substantially on the center of rotation thereof adapted for establishing communication between the centrifuge chamber and a refrigerant intake of the compressor, said centrifuge having a wall member exposed to the foaming action in the casing and extending generally radially outwardly from the rotational axis of said centrifuge for separating the centrifuge chamber from the foaming liquid in the casing, said wall member having an inlet opening spaced radially outwardly from said first outlet and being separate therefrom, said wall member having an imperforate portion radially intervening between said outlet and the inlet opening for restricting the entering flow of liquid laden gas substantially to the inlet opening, said centrifuge having a second outlet positioned radially outwardly of the inlet opening whereby foam bubbles drawn into the inlet opening are broken and the liquid is separated from the gaseous refrigerant in the centrifuge chamber and expelled therefrom via said second outlet.

4. The combination claimed in claim 3 wherein said second outlet comprises a peripheral portion of said centrifuge having a circumferentially extending opening therein spaced radially outward of said inlet opening and being separate therefrom.

5. The combination claimed in claim 3 wherein said wall member has a plurality of said inlet openings each spaced from one another by a circumferentially intervening portion of said wall member.

6. The combination claimed in claim 5 wherein said second outlet comprises a peripheral portion of said centrifuge having a plurality of circumferentially extending and spaced openings therein spaced radially outward of said inlet openings and being separate therefrom.

7. The combination claimed in claim 3 wherein said first outlet comprises an opening in said wall member.

8. The combination claimed in claim 3 wherein said centrifuge comprises a hollow, generally pancake-shaped body formed of two concave stampings fixed together with the concave sides thereof facing one another, said wall member comprising one of said stampings.

9. The combination claimed in claim 8 wherein each of said stampings has a series of circumferentially equispaced and extending notches with intervening portions in the peripheral edge thereof, said stampings being assembled together with said intervening portions contacting and with said notches in one stamping registering with the notches in the other stamping so that said registering notches form a series of arcuate outlet slots through the peripheral wall of said centrifuge.

10. The combination claimed in claim 8 wherein said first outlet comprises an opening in said wall member stamping located at the rotational axis thereof, and further including a mounting member positioned centrally of said hollow body concentric with the rotational axis thereof, said member extending outwardly from the other of said stampings and having a portion comprising a hollow mounting sleeve adapted to fit sealingly on a rotating member of the compressor.

11. The combination claimed in claim 10 wherein said mounting member comprises a tubular member having one end thereof contacting said wall member stamping and encircling said outlet opening therein, said tubular member having a series of circumferentially spaced openings therein providing communication between the surrounding interior chamber of said hollow body and said outlet opening.

12. In a refrigerating apparatus wherein a gaseous refrigerant is compressed, liquified, and evaporated in each cycle of operation of the apparatus, the combination of a mechanical compressor for compressing the gaseous refrigerant and having an intake conduit, an electric motor disposed adjacent said compressor and having stator windings and a rotor connected in driving relation with said compressor, a hermetically sealed housing adapted to receive the gaseous refrigerant and surrounding said motor and compressor to thereby enclose said motor and compressor and to form a low pressure collecting chamber for the gaseous refrigerant, means in the low pressure chamber of the housing for lubricating the compressor including an open sump arranged to contain oil, and a centrifuge mounted adjacent said stator windings at the end thereof remote from said compressor for rotation with said rotor, said centrifuge comprising a hollow body having a pair of walls spaced apart along the axis of rotation of said body and extending generally radially outwardly therefrom so as to define a centrifuge chamber therebetween, said body having an outlet passageway located substantially at said axis in communication with said compressor intake conduit, one of said walls having at least one inlet passageway extending therethrough spaced radially outwardly of said outlet passageway for admitting refrigerant gas from the low pressure chamber, said one wall having an imperforate portion disposed radially between said inlet and outlet passageways, the outer peripheries of said walls being spaced axially beyond the remote end of said stator windings and having portions thereof spaced from each other to form a second outlet passageway spaced radially outwardly from said inlet passageway.

13. The combination set forth in claim 11 wherein said walls of said centrifuge body comprise a pair of annular concave stampings fixed together with the concave sides thereof facing one another, said stampings having a radial dimension substantially greater than the axial dimension of the hollow body formed thereby to provide a generally pancake-shaped centrifuge.

14. The combination set forth in claim 11 wherein the one of said walls disposed closest to said motor is substantially imperforate and said inlet and first outlet passageways comprise openings in the other of said walls.

References Cited in the file of this patent

UNITED STATES PATENTS

| | | |
|---|---|---|
| 556,534 | Davis | Mar. 17, 1896 |
| 1,303,207 | Kelly et al. | May 6, 1919 |
| 1,967,034 | Lipman | July 17, 1934 |
| 2,228,364 | Philipp | Jan. 14, 1941 |
| 2,539,896 | Dalrymple | Jan. 30, 1951 |
| 2,575,315 | Edwards | Nov. 13, 1951 |